July 19, 1966
S. W. STRICKMAN
3,261,895
METHOD FOR MANUFACTURING RESIN PRODUCTS
INCLUDING FOAM PRODUCTS
Filed Oct. 29, 1963
8 Sheets-Sheet 1
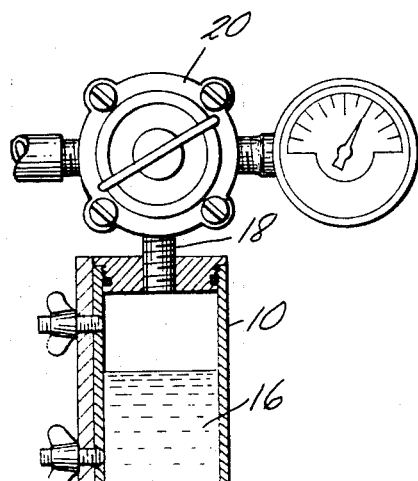
FIG. 1.
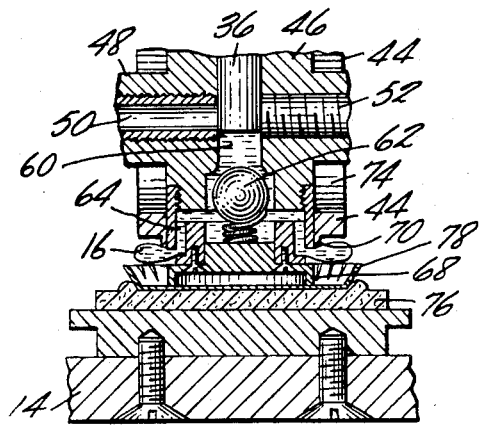
FIG. 3.
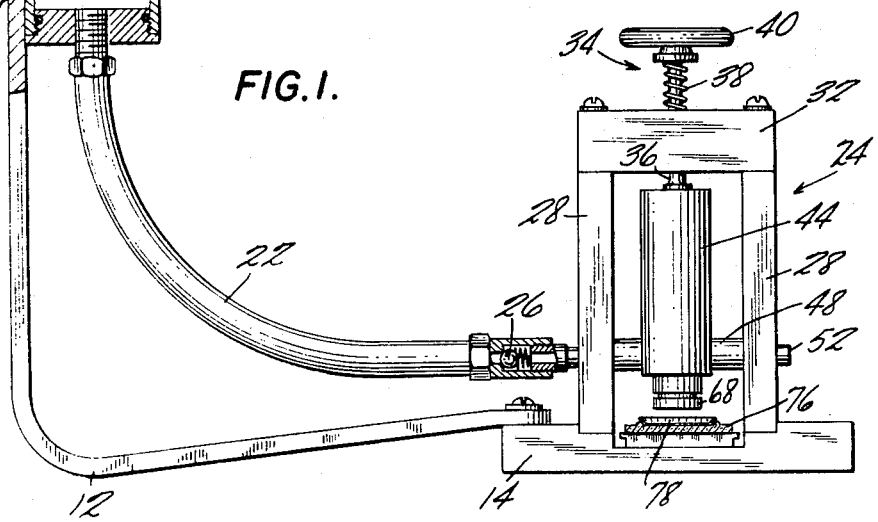
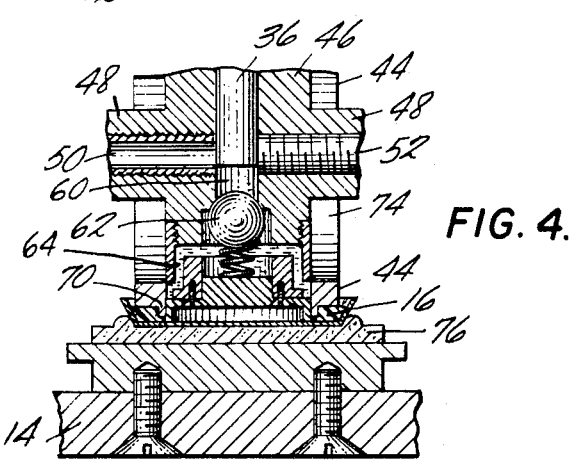
FIG. 4.
*INVENTOR.*
SAMUEL W. STRICKMAN
BY Brumbaugh, Free,
Graves & Donohue
his ATTORNEYS.

July 19, 1966  S. W. STRICKMAN  3,261,895
METHOD FOR MANUFACTURING RESIN PRODUCTS
INCLUDING FOAM PRODUCTS
Filed Oct. 29, 1963  8 Sheets-Sheet 3

INVENTOR.
SAMUEL W. STRICKMAN

BY his ATTORNEYS.

July 19, 1966

S. W. STRICKMAN 3,261,895

METHOD FOR MANUFACTURING RESIN PRODUCTS
INCLUDING FOAM PRODUCTS

Filed Oct. 29, 1963

INVENTOR.
SAMUEL W. STRICKMAN

BY his ATTORNEYS.

July 19, 1966 S. W. STRICKMAN 3,261,895
METHOD FOR MANUFACTURING RESIN PRODUCTS
INCLUDING FOAM PRODUCTS
Filed Oct. 29, 1963 8 Sheets-Sheet 5
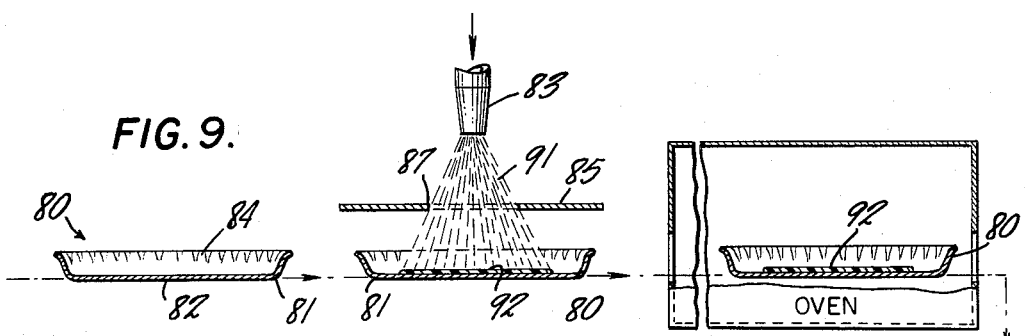
FIG. 9.
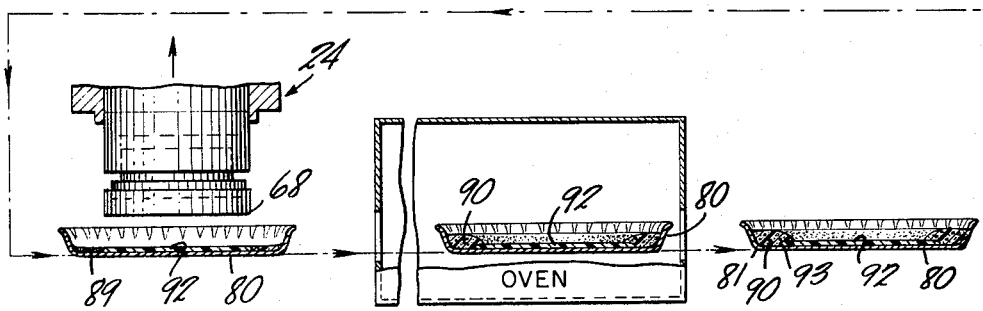
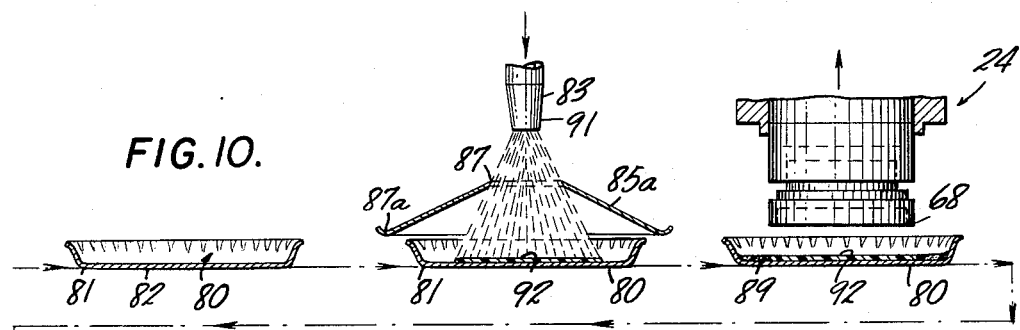
FIG. 10.
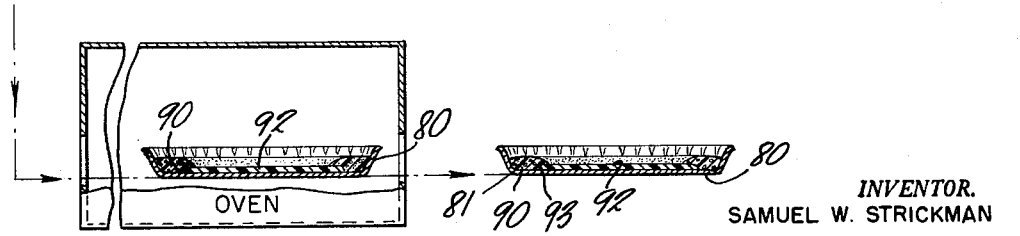
INVENTOR.
SAMUEL W. STRICKMAN
BY Brumbaugh, Free,
Graves & Donohue
his ATTORNEYS.

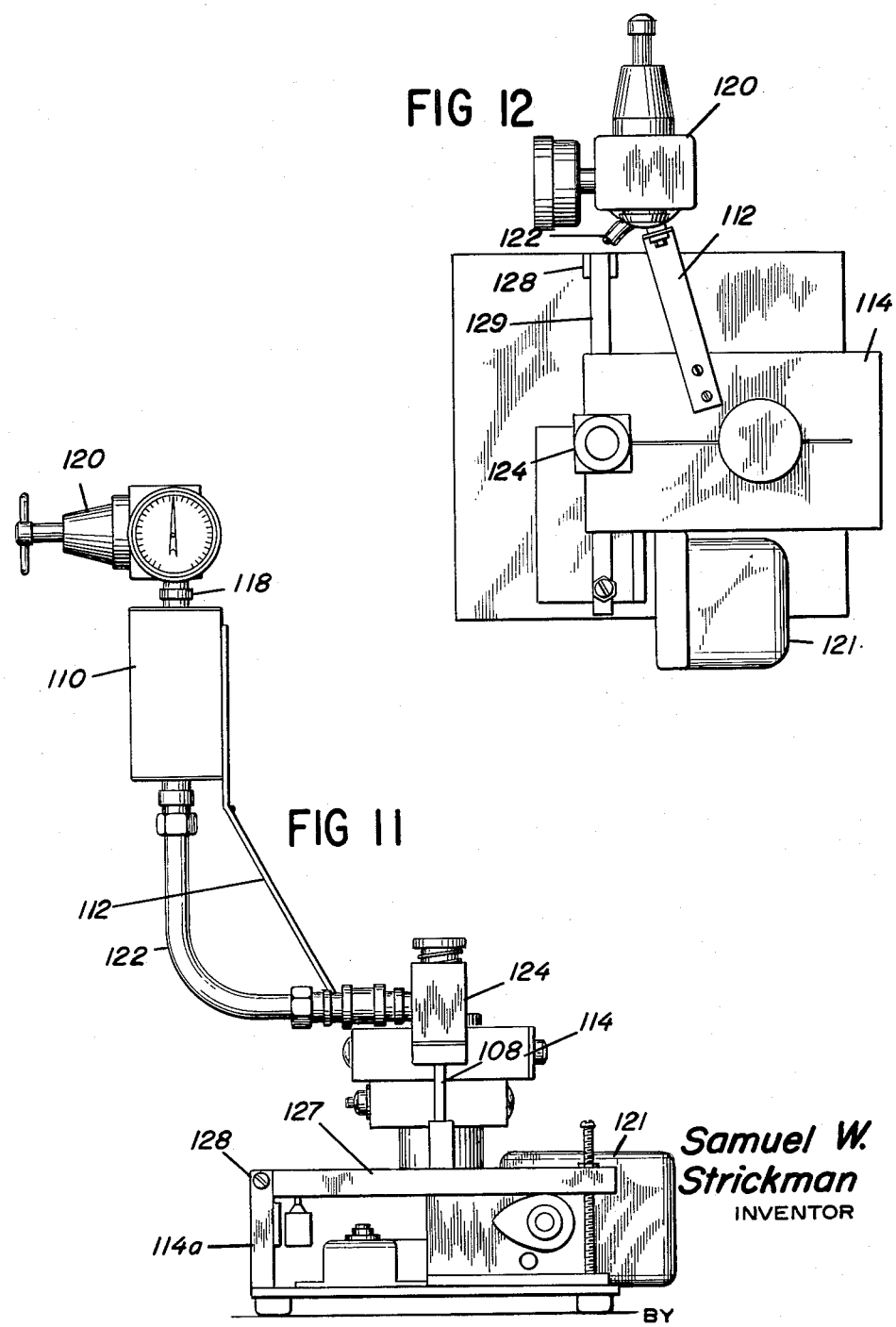

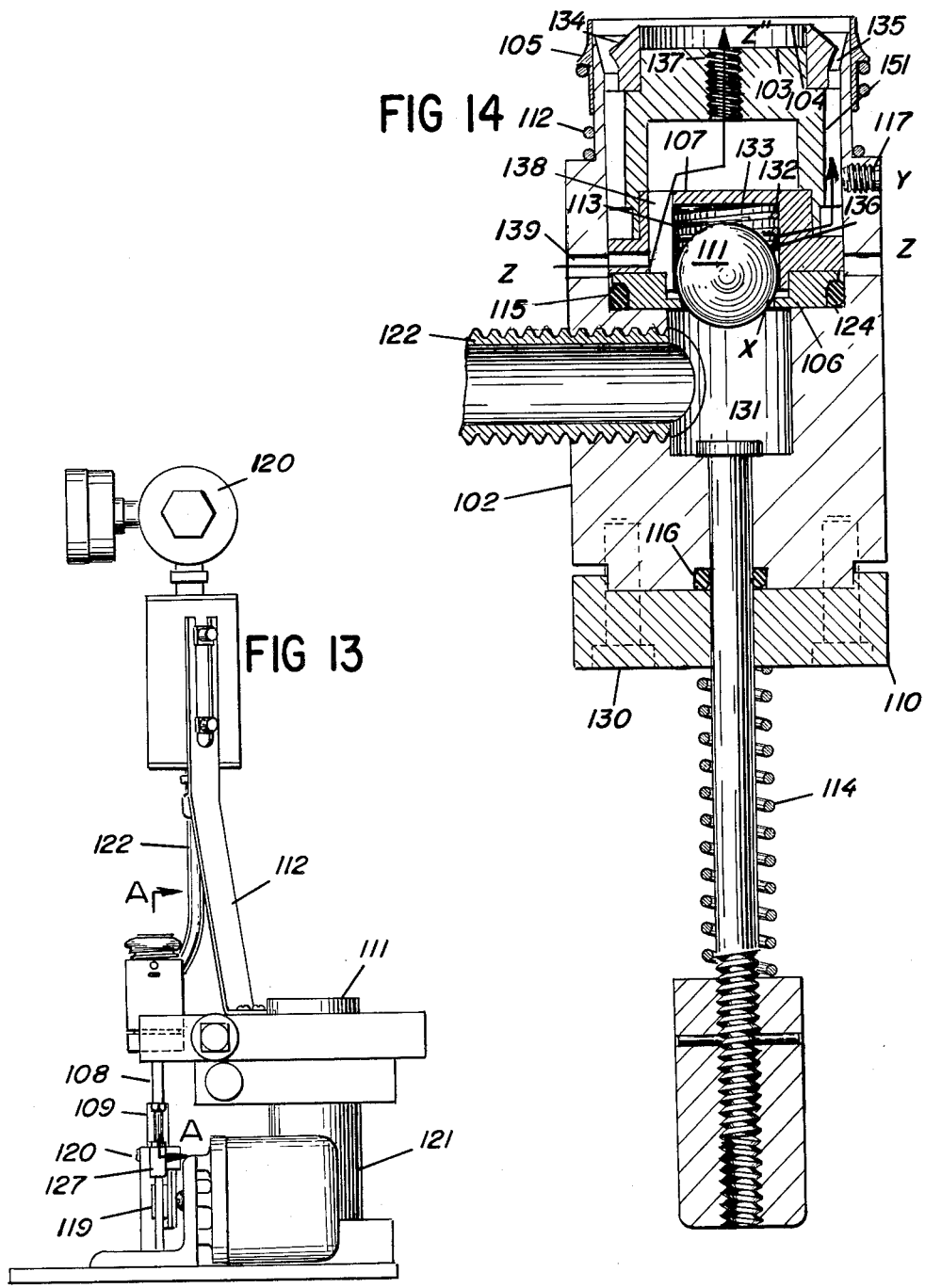

July 19, 1966 S. W. STRICKMAN 3,261,895
METHOD FOR MANUFACTURING RESIN PRODUCTS
INCLUDING FOAM PRODUCTS
Filed Oct. 29, 1963 8 Sheets-Sheet 8

Samuel W. Strickman
INVENTOR

BY Jacobi & Davidson

ATTORNEYS

United States Patent Office 3,261,895
Patented July 19, 1966

3,261,895
METHOD FOR MANUFACTURING RESIN PRODUCTS INCLUDING FOAM PRODUCTS
Samuel W. Strickman, Rego Park, N.Y., assignor to Rosen and Strickman, Newark, N.J., a copartnership consisting of Jacob J. Rosen and Samuel W. Strickman
Filed Oct. 29, 1963, Ser. No. 319,911
20 Claims. (Cl. 264—45)

This application is a continuation-in-part of my copending applications Serial No. 49,659, filed August 15, 1960, now abandoned and Serial No. 49,655, filed August 15, 1960, now abandoned, and in turn, is also a continuation-in-part of my prior applications Serial No. 742,816, filed June 18, 1958 and Serial No. 829,451, filed July 24, 1959, both of which latter-mentioned applications are now abandoned.

The present invention relates to methods for forming closure seals for containers, including improved closure caps having improved liners.

The crown type seal has a cushion pad or liner with a two-fold purpose: firstly, to prevent contact of the contents of the container with the shell body from which the crown type cap is produced, and secondly, to provide a gasket to conform to the possible irregularities between the lip of the container and the closing surface of the crown type cap. Prior practices for providing crown type closures have generally been (1) to make such pads of composition cork with a "spot" of metal foil, (2) to form the pads or liners of resinous compounds so as to have a uniform thickness over the entire top panel of the closure shell as well as the depending skirt or (3) to form such pads with a thicker annular area of the same material for engaging the lip of the container. In general, materials having high resistance to penetration would not demand as great a thickness for the first purpose as would be required to provide the necessary sealing gasket for conformation to the container lip. Accordingly, it is highly desirable from an economic point of view to provide a crown seal in which the liner or cushion pad has a thick outer annular portion of excellent resealable properties for engagement with the container lip and a thinner central portion having a high resistance to penetration to provide assurance against contact with the contents of the container.

The art has heretofore employed elastomeric or plastic materials of varying description, including plastisols of polyvinylchlorides, in the search to find more economically feasible materials for preparing the liner and/or seal having the hereinbefore mentioned characteristics. Foamable as well as non-foamable plastisols of polyvinylchloride have been heretofore employed. As their use has heretofore generally required some form of shaping of the surface of the liner to impart the desired liner characteristics mentioned above, the central portion covering the area to come in contact with the container's content and the thicker annular sealing portion are of the same material. The use of heretofore known foamable plastisols as liner materials in crown type closures has been curtailed because existing blowing agents prepare foams unsuitable for such use because residues therein are readily extractable by the container content and are toxic or off-flavor imparting or because such known blowing agents require techniques of application which are not readily amenable to limiting the foamed material in its contact with the container's content.

Prior known methods for forming liners in crown type closures employing such plastisols are generally characterized either (1) by employing a heated plunger and/or a cold plunger with a heated cap to form or shape the polymeric material to the desired surface characteristics of the liner and/or seal during some period of the required fluxing and/or curing steps, (2) by using centrifugal force to position the plastisol deposited as a glob in the interior upper surface to the desired surface characteristics by spinning the cap at relatively high speeds, or (3) by depositing a ribbon of the plastisol adjacent to the depending skirt portion of the closure from a point discharge outlet while the cap is rotated. Such prior art procedures are accompanied by a number of serious drawbacks. The use of a plunger to form the pad or liner of desired configuration requires expensive and complicated apparatus as the tolerances required of such plungers are relatively critical and it is necessary to contact the plunger with the plastisol during some period of the required curing steps thereby severely limiting the rate at which the caps can be produced. The known spinning techniques are limited in the rate of production and control of the distribution of the plastisol is difficult at best and the depending skirt is inadvertently and unevenly coated with plastisol and/or the thickness of the resulting gasket is subject to considerable variation. Moreover, the seals prepared by such methods require a relatively large quantity of plastisol with concomitant high rate of cost.

Accordingly, it is one feature of the present invention to provide a method for forming closure seals having cushion pads requiring a substantially lesser quantity of material to form than the cushion pads or liners employed in similar closures heretofore known.

A further feature of the invention is the manufacture of a crown type closure comprising a crown shell having a top panel, curved corner radius, depending skirt and a liner having a thin central portion formed from a non-foamable plastisol and a thicker annular portion of vinyl foam taking the form in cross section of a quadrant disposed peripherally about the inside surface of the shell having its arcuate surface extending between the top panel and some point on the curved corner radius adjacent the depending skirt, thus having a major portion of the foam adapted to surround the outside of a container mouth and only a flattened edge portion of the foam in sealing engagement with the top sealing edge of the container mouth. In a preferred form of practice for this feature the inner surface of the shell is coated with an impervious coating and the thin central portion of non-foamable plastisol is so disposed as to overlie the inner surface of the top panel to come in contact with the content of the container but such that the periphery of the thin central portion is free of engagement with the curved corner radius and depending skirt and the annular vinyl foam is bonded to the impervious coating on the curved corner radius and to a limited peripheral portion of the thinner central portion in such manner that the cured vinyl foam will have a minimum of contact with the content of the container assuring the production of a liner with a surface which is inert and impervious to the content of the container and one which has excellent resealable properties for engaging the lip of the container, and further assuring good adhesion of the liner to the crown shell adjacent the outer edge thereof.

Another feature of the invention is the provision of a method using an extrusion means having an annular shaped discharge outlet to deposit, at ambient temperatures and pressures, in the inner surface of a crown type closure an annular shaped extrudate of heat foamable plastisol taking the form in cross section of a quadrant having its arcuate surface extending between the top panel and depending skirt of the closure confined to a predetermined area of the inner surface by a die element cooperating with the annular shaped outlet so that the heat foamable plastisol can be foamed and cured at ambient pressures avoiding the use of a shaping plunger to form or shape the surface of the liner during the curing steps and enabling the application to the inner surface of the top panel of one material having outstanding characteristics for assuring against contact thereof with the contents of the container and the application of a different material having outstanding resealable properties to the limited area of the inner surface of the closure for engaging the lip of the container.

Another feature of this invention is to provide for the depositing of a viscous gasket forming material on the inner surface of a closure cap in a rapid manner as a charge of uniformly continuous, substantially orbiculate configuration being positioned so that the charge is confined to the area of closure which will have minimum contact with the contents of the container, specifically, that portion of the interior surfaces of the closure which will have contact with a sealing portion of a container in use.

Yet another feature of the present invention is to provide foamed polyvinylchlorides devoid of the disadvantages present in foamed resinous materials set forth above by providing a novel means of foaming the polyvinylchlorides by utilization of oxygen, released in situ, as the "blowing agent," together with an oxygen adsorbing agent for controlling the rate of foaming and concomitant properties of the resulting foam.

Further features and advantages of the present invention will become apparent from the more detailed description thereof as hereinafter set forth and the illustrative practice of the invention shown in the accompanying drawings in which:

FIGURE 1 is a side view, partially in cross section, of the preferred form of the apparatus utilized in the method of this invention;

FIGURE 3 is an enlarged fragmentary sectional view showing the discharge components of the dispenser of FIGURE 2 partway through their cycle of operation;

FIGURE 4 is another enlarged fragmentary sectional view showing the discharge components of the dispenser of FIGURE 2 in their relative position during the actual depositing portion of the operating cycle;

FIGURE 9 is a flow diagram showing one embodiment of the method of this invention;

FIGURE 10 is a flow diagram showing another and preferred embodiment of the method of this invention.

FIGURE 11 is a front elevational view of a dispensing device illustrative of one embodiment utilized with the method of the present invention;

FIGURE 12 is a top plan view of the apparatus of FIGURE 11;

FIGURE 13 is a side elevational view of the apparatus of FIGURE 11 showing some of the details of construction;

FIGURE 14 is a fragmentary view of the dispensing device taken as shown by the line A—A of FIGURE 13:

Figure 2:
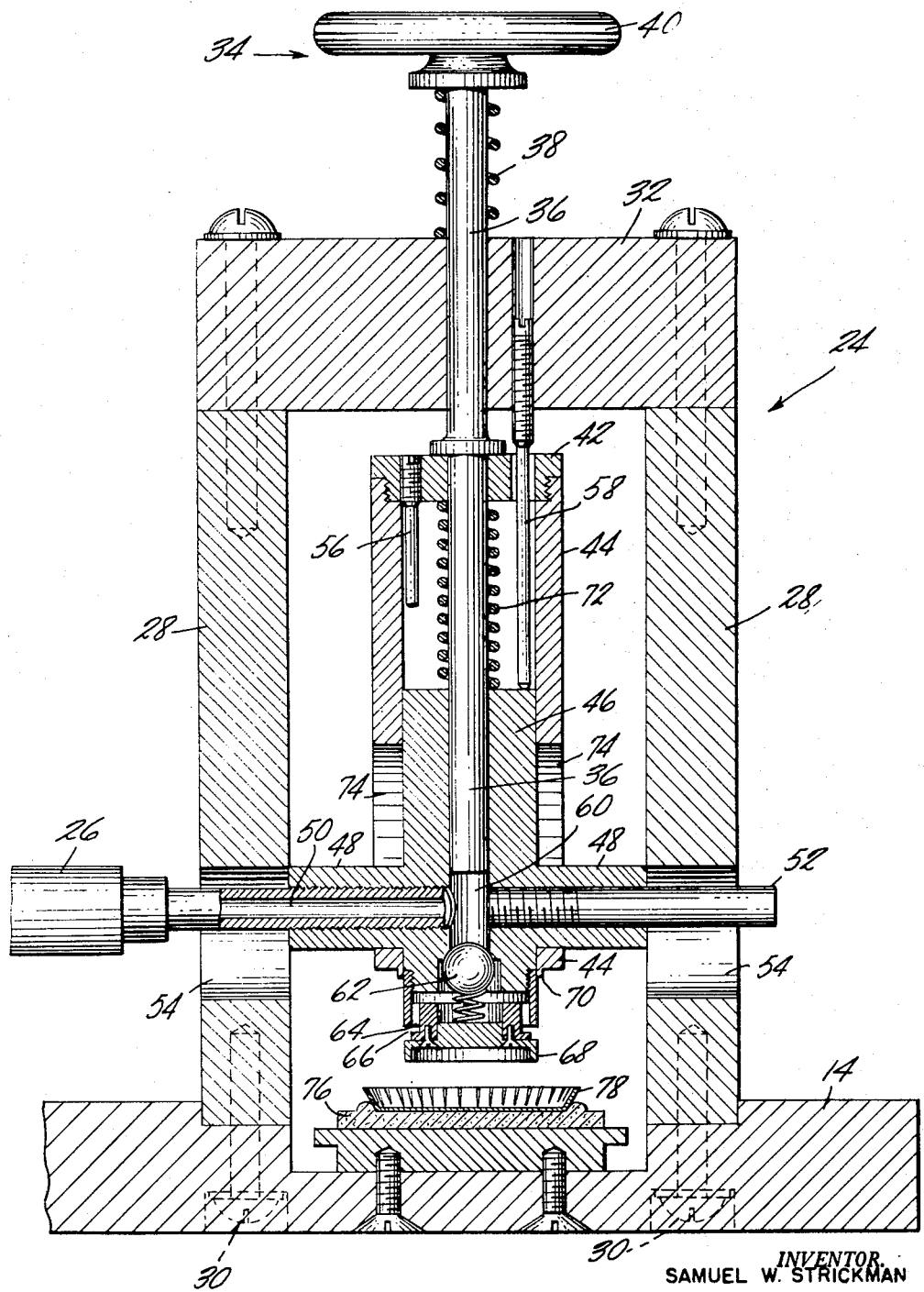
FIGURE 2 is a cross sectional side view of the dispenser used shown as part of the apparatus in FIGURE 1.

Subsequent portions disclose a number of preferred features of extreme importance in the preparation of closures of the crown type. Although the crown type closure has been selected herein for purposes of illustration and although methods for the provision of an improved crown seal is a primary feature of the present invention, it is to be understood that the various features of the invention can be applied to other closures where it is desired to obtain a foamed sealing gasket in a relatively simple, efficient, rapid and economical manner.

GENERAL CONSTRUCTION AND OPERATION

Referring to the drawings, and more particularly to FIGURE 1, the apparatus useful with this invention comprises a reservoir 10 supported by suitable supporting structure 12 on a base 14. The reservoir 10 is adapted to contain a viscous gasket-forming substance 16. A conduit 18 leads from the reservoir 10 to a source of compressed gas (not shown). A valve 20 is located in conduit 18 to regulate the flow of compressed gas to the reservoir 10. If desired, the reservoir 10 can be provided with an automatic feed and level-maintaining device (not shown).

A flexible conduit 22, preferably of metal, leads from the reservoir 10 to the dispensing device shown generally at 24. A pressure-sentitive ball check valve 26 is located in conduit 22, preferably adjacent the dispensing device 24. The ball check valve 26 may be of any well-known type adapted to open in response to pressure exerted thereon by material leaving the reservoir 10 and close in response to pressure exerted thereon by material in the dispensing device 24.

Referring now to FIGURE 2, the dispensing device 24 comprises an inverted U-shaped support having upright members 28 which are fastened to the base 14 by means of appropriate bolts 30. A transverse member 32 joins the upright members 28.

A dispensing unit 34 is provided, having a shaft 36 journalled for vertical, reciprocal movement in the transverse member 32. The dispensing unit 34 is biased upwardly in an open position by means of a spring 38 interposed between the top of transverse member 32 and a handle 40 of the dispensing unit 34.

A yoke 42 is attached to the shaft 36 at a point below the transverse member 32. The yoke 42 supports an outer sleeve or shearing element 44. Intermediate the shaft 36 and the outer sleeve 44 is an inner, independently reciprocating element 46, said element 46 being journalled on shaft 36 for vertical movement relative thereto. Projections 48 form a part of element 46 and encase the conduit 50 and a guide bar 52. By extending to both inner surfaces of support members 28, projections 48 serve to maintain the shaft 36 and the element 46 in a predetermined path during vertical movement thereof. As shown in FIGURE 2, conduit 50 and guide bar 52 extend beyond projections 48 and through slots 54 in each of the support members 28. The purpose of this structure is to permit vertical movement of the element 46 with attached structure and to guide it during said movement.

Two set screws 56 and 58 are provided. Set screw 56 is threaded in yoke 42 and projects downwardly therefrom. By controlling the distance travelled downwardly by the sleeve 44, set screw 56 controls the thickness of the deposited charge of gasket-forming material. Set screw 58 is threaded in support member 32 and extends downwardly through an opening in the yoke 42 provided for that purpose. By regulating the extent of upward travel of element 46, set screw 58 controls the quantity of gasket-forming material which is permitted to enter a chamber 60, and which is thereafter subsequently applied to the closure surface, as will be more fully described below.

Referring to the lower part of the dispensing device 24 shown in FIGURES 2, 3 and 4, a ball check valve 62 is seated in element 46 between chamber 60 and the exit passages 64. The exit passageways 64 comprise a series of radially-projecting bores which extend through the lower end of element 46. The exit passages 64 terminate on the exterior wall of element 46 in a peripheral orifice 66. The bottom of reciprocating element 46 forms a die at 68, said die 68 assuring positive contact with a closure surface when the gasket-forming material is being deposited. The die 68 also serves to confine the deposited material to the periphery of the closure surface. A projection 70 is provided at the lowermost point of sleeve 44 for the purpose of insuring a minimum thickness of the charge of gasket-forming material during the application thereof to a closure surface.

The valve 26 and the valve 62 can be of essentially the same construction, however, the pressure required to open valve 62 is greater than the pressure required to open valve 26. An adjustment in the compressive force of the valve springs provides this result which is necessary to ensure that pressure of material passing through inlet conduit 22 is sufficient to open valve 26, but not open valve 62.

A spring 72 is attached at one end to the upper surface of element 46 and at the other end to the lower facing surface of yoke 42 and is positioned about the shaft 36, intermediate the aforementioned elements. Spring 72 is shown in a substantially unstressed position in FIGURE 2. Movement of the yoke 42 toward element 46 compresses spring 72, while movement of yoke 42 away from element 46 expands the spring 72. The strength of spring 72 is controlled so that the downward movement of shaft 36 causes complementary downward movement of element 46 until further downward movement of element 46 is impeded by contact of the die 68 with a stationary object. The sleeve 44 is slotted at either side at 74 to permit vertical movement thereof relative to element 46 without interference with the projections 48.

A conveyor 76 is provided beneath the dispenser 34, the conveyor 76 being arranged to position a closure cap 78 directly beneath element 46 and its die 68. Movement of the conveyor 76 may be discontinuous and synchronized with the cyclic operation of the dispenser 34 by well known means, so that a new closure is advanced into place with each operating cycle.

In the operation of the apparatus of FIGURE 1, the viscous gasket-forming material 16 is placed under pressure by introducing compressed gas into the reservoir 10. The material is forced through the flexible conduit 22 and through the ball check valve 26, the latter being forced open by the pressure. The viscous material 16 enters the cavity 60 through conduit 50 during upward travel of the shaft 36 relative to element 46.

The dispensing operation is best described by following one complete cycle of its operation. As the dispensing unit 34 begins its downward travel, the entire unit, including the yoke 42, the sleeve 44, the element 46, the projections 48, and all other attached structure are also moved downwardly, the downwardly directed force applied to yoke 42 being substantially directly transferred to element 46 through the spring 72. Conduit 50 and guide 52 are permitted to move vertically by the provision of slots 54 in the support members 28. Element 46 stops its downward travel when die 68 comes into contact with the inner surface of a closure, shown at 78 in FIGURES 2, 3 and 4. Continued downwardly directed pressure on the handle 40 of dispensing unit 34 causes downward movement of the shaft 36 and of the sleeve 44 relative to the element 46, the same permitted by compression of spring 72. This has two effects. In the first place, it compresses the material 16 in the cavity 60 causing the ball check valve 26 to close and the ball check valve 62 to open. The material 16 is then extruded through the passages 64 and through orifice 66 as a bead formation on the outer surface of element 46, as shown in FIGURE 3.

Secondly, further downward movement of sleeve 44 and shaft 36 causes sleeve 44 to shear the bead of material 16 from the orifice 66, move it downwardly, and deposit it in a substantially orbiculate configuration on the surface of the closure. Downward travel of sleeve 44 and shaft 36 is arrested by one of two alternative means. The first of these is the set screw 56, which is positioned so that contact of the lower end thereof with the top of element 46 prohibits further downward movement of the yoke 42 with the attached shaft 36 and sleeve 44. Alternatively, further downward movement of these elements is stopped by contact of projection 70 on the downward face of sleeve 44 with the upwardly facing surface of the closure cap. Projection 70 has the additional function of assuring that the deposited charge of gasket-forming material is of a uniform and minimum depth.

After the charge of gasket-forming material of substantially orbiculate configuration has been deposited, the elements of the dispensing unit 34 are returned to their former position by simply removing the downwardly directed force on handle 40. During the return portion of the cycle, cavity 60 is enlarged by the upward movement of shaft 36 relative to element 46. This action lessens the pressure against the ball check valves 26 and 62, causing valve 62 to close and valve 26 to open, thus permitting entry of additional gasket-forming material through the ball check valve 26 and the conduit 50.

Although the apparatus described is designed for manual operation, it is evident that the dispensing unit 34 may be automatically achieved by suitable rotating cam means and that the operation thereof can be synchronized with a rate of movement of closures on the conveyor 76 to permit continuous depositing of gasket-forming material on the closure caps, withdrawal of said caps, and advancing of new caps.

Referring to FIGURES 11, 12 and 13, a dispensing device illustrative of a device for use with another embodiment of the present invention comprises a reservoir 110 adapted to contain a viscous gasket-forming substance supported by suitable supporting structure 112 on a base assembly 114. A conduit 118 leads from the reservoir 110 to a source of compressed gas (not shown). A valve 120 is located in conduit 118 to regulate the flow of compressed gas to the reservoir 110. If desired, the reservoir 110 can be provided with an automatic feed and level-maintaining device (not shown).

A conduit 122, preferably of metal, leads from the reservoir 110 to the dispensing device shown generally at 124. A pressure-sensitive ball check valve 126 is located in conduit 122, preferably adjacent the dispensing device 124. The ball check valve 126 may be of any well-known type adapted to open in response to pressure exerted thereon by material leaving the reservoir 110 and close in response to pressure exerted thereon by material in the dispensing device 124.

A means for transferring reciprocating vertical movement to plunger 108 is provided which includes an operating lever arm 127, pivotally attached to upright supporting base member 114a by means of pinion 128, and adapted to respond to raise and lower in response to the eccentric motion of cam 119 rotated by motor 120.

Referring now to FIGURE 14, the dispensing head 124 includes an outer body member 102 rigidly supported by base assembly 114. Outer body member 102 is provided with a large axial bore which extends downwardly from the upper end thereof. The outer surface of the upper portion of outer body member 102 is reduced to provide a thinner annular or barrel shaped section upon which outer die member 105 is slidably mounted and biased upwardly by open helical coil spring 112 interposed around members 102 and 105 between the upper surface of annular shoulder or ledge 101 and the lower surface of annular flange 123 on element 105. Approximately midway down the length of body member 102, the axial bore is reduced to provide annular shoulder or ledge 129 adapted to seat member 106. A sealing gasket 115 is disposed between member 106 and the inner surface of the axial bore to provide a leak proof seal therebetween. Element 106 is provided with an aperture within which a ball type check valve 111 is mounted. The ball check valve is urged into engagement with the aperture of element 106 by coil spring 113 mounted within the cavity 132 of spring retainer cup 107. Spring retainer cup 107 is rigidly seated on member 106 by engagement with core element 103. Core element 103 is disposed within the axial bore of member 102 by annular shaped spreader and die member 104 to form annular shaped chamber 151. The inner cavity of element 103 and the outer upper surface of member 107 form cavity 132. Chamber 151 is in communication with a peripheral annular orifice 166 on the face of the dispensing head by a series of axially projecting bores of passages 135 which extend through the lower peripheral annular flange of element 104 which is adapted to engage the inner surface of outer body member 102 and rigidly secure the upper end of core 103. Outer body member 102 is further adapted at the end opposite the peripheral annular shaped outlet to receive reciprocatory plunger 108 which is journalled for vertical, reciprocal movement through the lower end portion of outer member 102, gasket 116 and cap 140. Cap 110 is secured to body member 102 by appropriate bolts 130.

The heat foamable plastisol placed under pressure by the introduction of compressed gas into reservoir 110 is forced through conduit 122 and ball check valve 126 and into cavity 131 as plunger 108, shown biased in a most downward position by means of coil spring 114 which surrounds plunger 108 interposed between the top surface of end cap 109 and the bottom surface of cap 136, is retracted.

As plunger 108 continues its reciprocating movement and moves upwardly, it compresses the foamable plastisol within chamber 131 causing ball check valve 126 to close and ball 111 to move upward and compress spring 113 allowing the plastisol to enter chamber 132 via the aperture in member 106. Chamber 132, formed by the valve spring retainer cup, is in communication with chamber 151 by a series of radially projecting bores 136 extending through the wall of valve spring retainer cup 107 and terminating on the wall of core element 103 which forms chamber 151. As plunger 108 continues its reciprocating movement through another cycle, a subsequent amount of plastisol is forced into chamber 151 which in turn forces an equal amount of the plastisol through the axially projecting bores 135 into and overflowing annular shaped orifice 134 to form a continuous substantially uniform annular shaped bead.

Element 106 which is slidably mounted about the upper end of element 102 and element 104 cooperatively form a die which assures confining the extrudate to a predetermined area of the closure surface when the gasket forming material is being deposited thereon. As the crown cap blank is brought into register with the dispensing head, initial contact is made between element 105 and the depending skirt of the crown type closure blank immediately adjacent the cornice or top panel. Increased pressure of the cap blank upon element 105 causes element 105 to slide downward on outer body member 102. The resulting compression on spring 114 assures contact of the uppermost edge of element 105 with the inner surface of the closure blank sufficient to uniformly confine the plastisol extrudate. As element 105 slides downward in response to continuing pressure on the blank, die member 104 is brought into proximity with the inner surface of the top panel sufficient to uniformly confine the extrudate. Substantially simultaneously therewith, a quantity of foamable plastisol is forced to overflow the annular shaped orifice 166 and to be distributed substantially uniformly within the cavity making contact within the inner surface of the closure cap blank defined by elements 104 and 105.

The quantity of plastisol extruded from the annular shaped outlet, perforce the thickness, width and general shape of the extrudate deposited within the cup shaped shell, is cooperatively determined by the compressive force of valve spring 113, the length of the stroke of plunger 108 and the compressive force upon coil spring 112, i.e., the distance outer die element 105 is exposed above the terminal edge of the tubular extension of body member 102. The compressive force upon coil spring 112 is determined by the pressure which the crown closure cap, i.e., the means by which the cap is placed over the outlet of the discharge device, exerts on outer die member 105.

In disengaging the closure cap blank from the dispensing head, the distance between inner die element 104 and the inner surface of the top panel of the cap increases and the foamable plastistol has a tendency to "tear away" from the mass and contact with the closure cap due to a partial vacuum arising within the cavity formed by the inner surface of the cap blank, the deposited charge of foamable plastisol and the upper surface of the dispensing head with concomitant lack of uniformity and imperfections in the deposited ring of plastisol. To counter the "tearing away" arising from the formation of the partial vacuum, the cavity formed by the inner surface of the cap blank, the deposited charge of foamable plastisol and the upper surface of the dispensing head is subjected to pressure sufficient to prevent formation of the partial vacuum therein. In general, the partial vacuum is prevented by exposing the cavity to atmospheric pressure via a passageway which includes bore 137 extending from the upper surface of core element 103 to the upper inner surface of axial bore cavity 132, a number of extending bores 138 which project axially through the wall of valve spring retaining cup 127 from the inner surface of cavity 132 and communicate with a comparative number of radially projection bores 139 in outer body member 102 which in turn terminate at the exterior surface of outer body member 102.

As disengaging of the crown closure blank from the dispensing device continues interplay between the adhesive forces of the plastisol and the inner surface of the closure cap, the adhesive forces between the plastisol and the die members and the cohesive force of the plastisol components produces a slight uniformly outward and downward pull upon the deposited plastisol ring resulting in a charge of heat foamable plastisol of uniformly continuous, substantially orbiculate configuration positioned so that subjecting the cap with the deposited mass to temperatures sufficient to actuate the foaming agent produces a cured cellular sealing surface or gasket taking the form in cross section of a quadrant having its arcuate surface extending between the top panel and the depending skirt having a major portion of the foam adapted to surround the outside edge of a container mouth and only a flattened edge portion of the foam in sealing engagement with the top sealing edge of the container mouth.

The closure seal generally resulting from curing the charge of foamable plastisol deposited as above has excellent resealable properties and has a broad field of application. However, where the closure is of a crown type to be employed in closing containers having the content under substantial pressure, e.g. carbonated beverages, the cap blank with the foamable plastisol ring deposited as described above is preferably subjected to slow rotational motion and the rotating surface of the plastisol ring contacted with a skimming means having a concave arcuate contact surface extending between the top panel and the depending skirt of the closure blank for a period of time sufficient to dispose the annular shaped deposit into taking the form in cross section of a quadrant having its arcuate surface extending between the top panel and the depending skirt having a high degree of uniformity.

Figure 15:
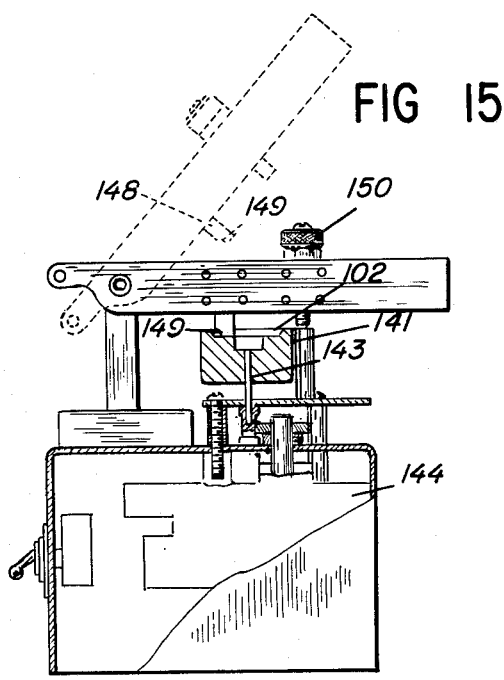
FIGURE 15 is an elevational view, partly diagrammatical, of an apparatus illustrative of an added and preferred embodiment for use with the method of the present invention.
Figure 17:
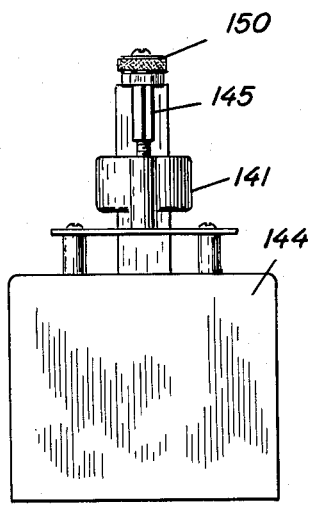
FIGURE 17 is a side elevational view of the apparatus of FIGURE 15.
Figure 16:
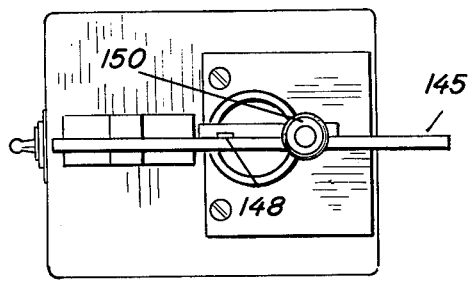
FIGURE 16 is a top plan view of the apparatus of FIGURE 15.

The skimming operation is conveniently carried out in accordance with an additional embodiment of the present invention as illustrated by FIGURES 15, 16 and 17. Referring to these drawings and more particularly to FIGURE 15, the apparatus utilized in this embodiment comprises a means for imparting rotational motion to the crown cap which includes matrix block 141 with a recess in the surface adapted to fit the outer conformation of the cap blank, and further recessed therein is a magnet 142 for holding the cap blank within the recess of the matrix block, drive shaft 43 adapted to be rotated by a speed reduction means and motor shown generally as 144. As the cap blank with the deposited annular shaped charge of foamable plastisol comes into register with the recess in the surface of the matrix block 141, lever arm 145, pivotably mounted to supporting upright member 146 by pinion 147 and holding the skimming tool 148 with the concave arcuate shape contact surface 149 is lowered so that the skimming contact surface comes in contact with the rotating surface of the plastisol ring. Lever arm 145 is further adapted to hold adjustment means 150 by which the pressure of the contact surface of element 148 upon the surface of the plastisol ring is adjusted.

In general, the cap blank is rotated at speeds sufficiently slow to prevent movement of or irregularities in the surface of the deposited plastisol by centrifugal force of rotation.

The skimming tool contact surface is maintained in contact with the surface of the plastisol ring for a period of time to sweep the surface so as to provide a ring having uniform height, i.e., one to two seconds.

Although the apparatus for use with the aforementioned embodiments of the present invention have been described as individual components it is evident that the operation thereof can be synchronized with the rate of movement of the closure blanks to such components by suitable known means to permit continuous depositing of the gasket-forming material on the closure blanks, withdrawal of the blank and advancing the withdrawn blanks to the next required operational step.

In the method of this invention, the crown shells, or other closure caps, may be prepared in the customary fashion by providing a sheet of steel or tin plate with lithographed matter on one face and with a coating of a vinyl resin lacquer on the other or inner face. A further coating of non-foamable plastisol over the lacquer may be employed and in fact is a preferred embodiment. The charge of heat foamable plastisol is then applied, advantageously by means of the dispenser of this invention, to the peripheral portion of the inner face of the closure, i.e., that portion of the inner face of the crown shell which will permit a minimum of contact with the contents of the container for which the crown shell is to be used as a closure, and allow for a seal about the outside edges of the mouth of such container. Following the application of the heat foamable plastisol the closure blank is subjected to temperatures above 200° F., preferably between 280° and 310° F., for a period of time sufficient to foam the ring to approximately 3 to 6 times its original volume.

Two of the preferred embodiments of the method of this invention are illustrated in FIGURES 9 and 10. Referring to FIGURE 9, a steel blank 80 is provided in which the circular end top panel 82 is bounded by a curved top corner radius 81 and a corrugated skirt portion 84. The outer surface of the blank is provided with a lithograph coating, not shown, and the inner surface of the blank is provided with a coating of vinyl resin lacquer, also not shown.

As a first step in the method, the steel blank 80 is positioned beneath a nozzle 83 which is adapted to dispense a measured quantity, preferably 50–60 milligrams, of non-foaming plastisol 92 as a spray, depositing a layer of uniform thickness as shown in the drawing at 92. Interposed between the blank 80 and the nozzle 83 is a baffle 85 having a circular opening 87 therein which serves to confine the spray of plastisol 91 to a predetermined area on the top panel 82 when the crown blank 80 is disposed coaxially with the opening. As shown in the drawing, the unfoamed plastisol is confined to the center area of top panel 82 spaced apart from the curved corner radius 81 preferably by from $\frac{1}{16}$ to $\frac{1}{8}$ of an inch. By positioning the center spot in this manner, flashing of the plastisol during subsequent steps in the method is avoided. Also, the spacing permits direct application of the foamable fluid mix onto the lacquer coating and permits formation of a stronger bond between the final sealing ring and the blank.

Following the application of the non-foaming plastisol as a center spot, the blank 80 is passed to an oven as shown, where the layer of plastisol is heated to a temperature above 200° F., preferably from 320° F.–350° F., for 1 to 3 minutes to flux the resin and to at least partially cure it. Alternatively, the blank 80 can be passed under a suitable source of heat rays such as an infrared lamp means or an ultra-violet lamp means. Following this step the blank and plastisol center spot are cooled and the blank 80 is positioned beneath a suitable apparatus for dispensing a foamable fluid mix in a ring form, such as dispenser 24 described above. The dispenser 24 deposits a measured quantity, preferably between 100 and 110 milligrams, of a foamable fluid mix on the peripheral area of the top panel 82 adjacent the rounded corner radius 81 and the center spot of unfoamed plastisol 92.

The blank 80 is next inserted in an oven and the ring of foamable material is subjected to a temperature above 200° F., preferably between 280° F. and 310° F., for a period of less than 3 minutes to foam the ring to approximately 3 to 6 times its original volume. As shown in the last step of the flow diagram of FIGURE 9, a ring of foamed polyvinylchloride 90 fills the area of the curved corner radius 81 extending upwardly to, but not covering, the edge of the corrugated skirt portion 84. In addition, during the foaming step, the ring 90 has overlapped a slight portion of the unfoamed plastisol center spot 92 as shown at 93. Generally speaking, the foamed ring of sealing material has the form in cross section of a quadrant having its arcuate surface extending between the top panel 82 and a point on the curved corner radius 81 adjacent the skirt portion 84.

An alternate embodiment of this invention is shown in FIGURE 10 wherein a blank 80 as shown in FIGURE 9 is coated with a center spot of unfoamed plastisol 92 and a peripheral ring of foamed fluid mix 90. In this embodiment, a conical baffle 85a is employed to facilitate recovery of the sprayed non-foamable plastisol which is retained by the baffle. A gutter 87a in the baffle 85 is provided to direct excess plastisol to a collecting means, not shown. In addition to this feature, the modified baffle provides less problems with fouling of the circular opening 87 with a consequent increase in the accuracy of measuring the amount of non-foamable plastisol applied as a spot 92.

It will also be noted that the modification shown in FIGURE 10 applies the peripheral ring of foamable plastic material before the center spot is fluxed. Thereafter both the foamable and non-foamable materials are heated in an oven to foam and cure the foamable material and to cure the non-foamable material. In the practice of this embodiment, it is of course essential that the two materials have the compatible temperature requirements for foaming and curing.

Figure 5:
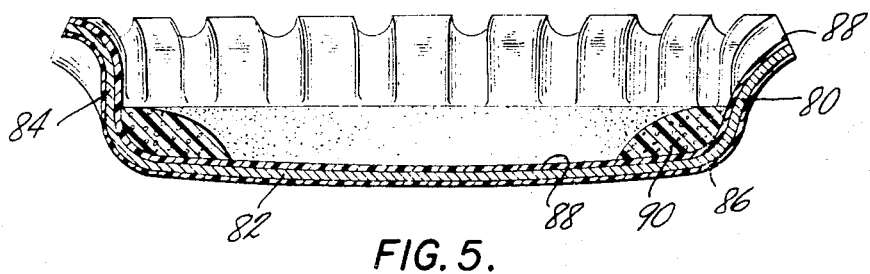
FIGURE 5 is a cross sectional view of a crown closure constructed according to this invention.
Figure 6:
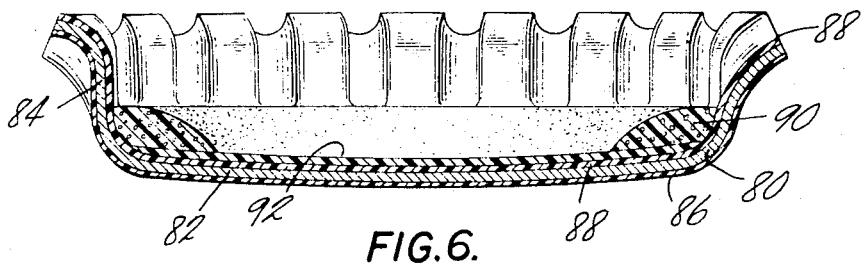
FIGURE 6 is a cross sectional view of a form of crown closure provided by this invention and provided with a plastisol liner.

Two embodiments of crown seals formed according to this invention are shown in FIGURES 5 and 6. In FIGURE 5, the crown closure comprises a steel blank 80 having a top or crown panel 82 and a peripheral skirt 84 projecting therefrom and provided with crimps terminating in spaced relation to the crown panel. The outer surface of the blank 80 is provided with a lithographed coating 86. The inner surface of blank 80 is provided with a coating of lacquer 88. On the periphery of the inner surface is a gasket 90 of foamed polyvinylchloride composition. The gasket 90 is of substantially orbiculate configuration and is confined to those portions of the blank 80 which will contact the top and side edges of the container mouth. The sealing gasket 90 has excellent adherence to the blank 80 and when placed upon a bottle and sealed forms an excellent seal which does not impart off-flavors to the contents of the container.

FIGURE 6 illustrates a preferred embodiment of a crown prepared according to this invention. In this embodiment, a coating of unfoamed plastisol 92 is applied to the inner surface of the blank 80 so that it overlies the lacquer coating 88 on the crown panel 82. This embodiment is of special advantage in instances where lacquer does not satisfactorily protect the steel crown from attack by container contents.

Figure 7:
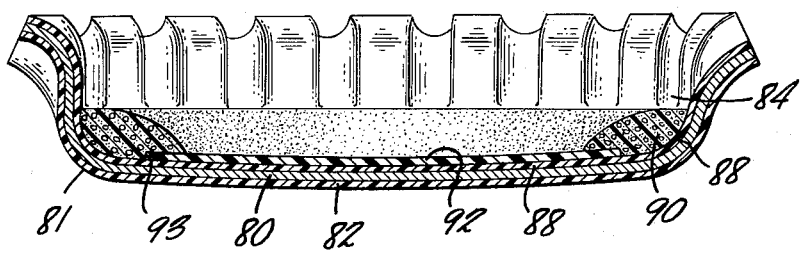
FIGURE 7 is a cross sectional view of the preferred form of crown closure provided by this invention and a center spot of cured, unfoamed plastisol spaced apart from the skirt portion.

FIGURE 7 illustrates the embodiment of the crown prepared according to the methods outlined in FIGURES 9 and 10. A spot of unfoamed plastisol 92 overlies the lacquer coating 88 in the central area of the crown panel which will eventually be directly exposed to the container's content. The spot 92 does not extend across the entire top panel 82. Instead, the spot 92 is spaced some distance, preferably from 1/16 to 1/8 of an inch, from the curved corner radius 81. The foamed ring 90 extends from a point on the curved corner radius 81 adjacent the skirt portion 84 to the spot 92 and a substantial portion of the ring 90 is in direct contact with the underlying lacquer coating 88, thus insuring a strong bond. Preferably, the ring 90 also slightly overlaps the spot 92, as shown at 93.

Figure 8:
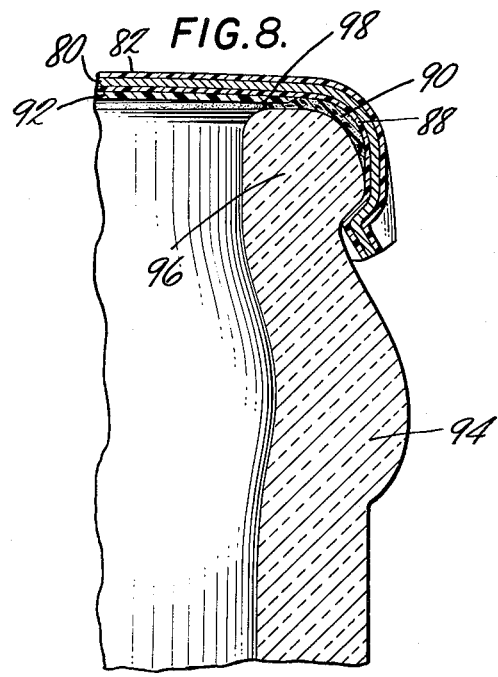
FIGURE 8 is a cross sectional view of a container carrying crown closure of FIGURE 7 thereon in sealing relation with the container mouth.

FIGURE 8 illustrates the relative positions of the unfoamed plastisol spot 92 and the foamed ring 90 after the cap 80 has been applied to a conventional container 94 having a lip 96. It will be noted that the ring 90 has undergone compression and that a minimum area of contact of the foamed material is presented to the interior of the container, as shown at 98, and that the ring provides a seal along the top and side peripheral edges of the beaded lip 96.

HEAT FOAMABLE PLASTISOLS

Heat foamable plastisols suitable for the gasket forming material of the present invention comprise as basic ingredients (a) a resin, (b) a plasticizer therefor, (c) a foaming agent capable of releasing oxygen in situ at temperatures above about 200° F. and (d) an oxygen adsorbing agent for controlling the rate of foaming and the concomitant properties of the resulting foam such as density, deflection rate, hand, tensile strength and sealing characteristics.

It has been found that for crown liner seals for each 100 parts of resin, it is preferred to use from 42 to 100 parts of plasticizer, from 1 to 10 parts of blowing agents, from 10 to 60 parts of the oxygen adsorbing agent, and from 1 to 3 parts of stabilizer.

The resinous materials used according to this invention include the polyvinyl chlorides which may be of the well known stir-in type. Typical of this type of polyvinyl chlorides are the well known polyvinyl chlorides available commercially as "QYNV," a product of Bakelite Co., division of Union Carbide & Carbon Co., Geon 121, a product of B. F. Goodrich Chemical Co., Opalon 410, a product of Monsanto Chemical Co., VR 50, U.S. Rubber Co., and those produced by other well known manufacturers. In general, mixture of a resin having a slow solvation rate and a resin having a fast solvation rate produces a foam having a desirable uniformity and cell structure. Preferred sealing characteristics in crown liners and/or seals are obtained with Opalon 410. Mixtures of Opalon 410 and Geon 121 are particularly preferred.

Other vinyl resins known in the art to be suitable for use in preparing foamed articles may be employed according to this invention. Thus, copolymers of vinyl chloride and vinyl acetate, such as the 97:3% copolymer, copolymers of vinyl chloride and vinylidene chloride, and copolymers of vinyl chloride and ethyl maleate may be employed. In applications where the foam will be required to resist aqueous solutions, the chloride content of the polymer or copolymer should be high; preferably the copolymer should contain at least 90% of the vinyl chloride. Generally, the proportion of resin to plasticizer may range from 40 parts of resin to 60 parts of plasticizer depending on the nature of the plasticizer.

A wide variety of plasticizers well known in the resin and plastics art may be used, such plasticizers are either monomeric or polymeric, or a combination of both. Illustrative of the monomeric types are acetyl-tributylcitrate, glycollic acid esters (Monsanto), butyl-decylphthalate, octyl-decyl-phthalate, dioctyl phthalate, tricresylphosphate, triphenylphosphate, dicapryl-phthalate, dioctyl-sebacate, dioctyl-adipate, diisooctyl adipate, diisooctyl phthalate, Harflex 500 (Harchem), 4GO (Carbide and Carbon). For crown closures to be used for carbonated soft drinks, acetyl tributyl citrate is a preferred plasticizer.

Among the polymeric types of plasticizers are "Plastolein 9720" (Emery Industries, Inc.) (see bulletin entitled "Plastolein Plasticizers," copyright 1954), Plasticizer 711 (Archer-Daniels-Midland), "Plastolein 9758" (Emery), Harflex 300 and Harflex 330 (Harchem), and R2H (Carbide and Carbon).

It is to be noted that where the foamed material of this invention is used in connection with products for human consumption, as, for example, closures for containers of foods or beverages, it is desirable to utilize plasticizers or mixtures of plasticizers that are not readily subject to extraction by the food or beverage and which are not toxic. Accordingly, the polymeric (relatively high molecular weight) plasticizers which are not subject to complete or substantially complete extraction are preferred, although acetyl-tributyl citrate and the glycollates (even though they are monomeric) are useful.

The oxygen which is released in situ so as to foam the heat foamable mixtures of the invention is readily supplied by contacting an alkali metal perborate, peroxide and/or perchlorate with a component slightly more acidic than the oxygen supplying component, i.e., a component having a sufficient acidity as to the oxygen supplying ingredient so as to facilitate decomposition of the ingredient within the environment of the compositions thereby liberating oxygen in situ. Alkali metal perborates, particularly sodium perborate, are preferred. Exemplary acid components include acid salts of polybasic inorganic acids such as alkali metal hydrogen phosphates, alkaline earth metal hydrogen phosphates; and metal salts of higher molecular weight organic carboxylic acids and weaker bases such as calcium stearate, aluminum stearate, zinc stearate, magnesium stearate, and the like. Disodium phosphate and Stayrite No. 90 (a mixture of metallic soaps, predominately calcium, aluminum and zinc stearates, with minor amounts of other fatty acids) manufactured by the Witco Company are particularly preferred.

The oxygen adsorbing agents which may be used according to this invention may be any finely divided material which will adsorb a substantial portion of the gaseous oxygen evolved during the heating of the oxygen-producing material at a certain temperature and which will release the oxygen at a higher temperature. Examples of suitable oxygen adsorbing agents include finely divided anhydrous aluminum oxide, activated carbon, mica, silica gel, barium sulfate, carbon black, aluminum flake, resin-coated calcium carbonate, anhydrous borax, magnesium trisilicate and resin coated chalk. Anhydrous aluminum oxide is particularly preferred.

The proportions of acidic component, e.g., disodium acid phosphate and the oxygen supplying component, e.g., sodium perborate, can vary from 1:1 to 6 parts of phosphate to 45 parts of perborate. In general the oxygen supplying component as well as the acid phosphate should be of a state of division so as to pass through a screen having a mesh size of at least 200. When sodium perborate and/or anhydrous aluminum hydroxide are used as oxygen supplying and oxygen adsorbing components, respectively, the particles should pass through a screen size having a mesh of at least 325.

The sequence in which the ingredients of the foamable fluid mix are combined is an important feature of this invention. According to the preferred method, the vinyl resin must be mixed in and thoroughly wetted by the plasticizer before the oxygen adsorbing agent is added. If the reverse sequence is employed, the oxygen absorbing agent is apparently unable to function properly, and it is not effective in adsorbing released oxygen. As a consequence, the blowing system fails.

The following examples are in accordance with this invention:

*A crown for bottles containing carbonated beverages, standard size (1)*

A crown for bottles containing carbonated beverages wherein a liner, using a foamed material made in accordance with this invention in lieu of cork, is produced as follows:

The customary tin-coated steel shells, formed from tin-coated steel (lacquered to assure adhesion of the polyvinyl chloride) are employed. The lining material is a foamed fluid mix prepared from polyvinyl chloride (e.g., Opalon 410) 100 parts; plasticizer (Plastolein 9720) 80 parts; disodium phosphate (mesh size at least 200) 6 parts; sodium perborate (mesh size at least 200) 6 parts; resin-coated chalk (e.g., "Surfex MM," Diamond Alkali Co.) 10 parts as filler, carbon black, 0.01 part; ferric oxide, 0.15 part as pigmenting materials.

The foregoing ingredients are worked up as follows:

To the plasticizer there are added the disodium phosphate and the perborate. They are stirred to make a good suspension. To that suspension there are added the carbon black and ferric oxide. These are thoroughly stirred. Then, with stirring, the resin is added and the mixture is thoroughly stirred. To the mixture is then added the filler (the resin-coated chalk), and the whole mass agitated until a smooth mixture is obtained. This fluid mass or mix is then de-aerated to remove entrapped air.

The fluid mix is passed through a metering device whereby about 275–350 mg. are deposited on each shell. The thus-coated shells are centrifugally spun and placed on a heated surface of about 275° F. for about 2 minutes, thereby to effectuate the foaming. Then they are placed in an oven at a temperature of about 350°–375° F. for about 5 minutes to effectuate fusion; and then removed from the oven and allowed to air-cool. They are ready for use.

*Shallow-sized crown*

A shallow crown can be provided with a liner of foamed resin in accordance with this invention wherein the amount of the plasticizer, disodium phosphate, perborate and pigments are used as in the manufacture of the standard crown described above. The resin component may be increased to 105 parts in the fluid mix to reduce resilience, if desired; and using as a filler, 20 parts of barium sulfate (e.g., "Sparmite," a brand of barium sulfate of the C. K. Williams Co.).

*Standard size crown (2)*

A foamable fluid mix was prepared from the following ingredients in the indicated proportions:

Opalon 410, a commercial polyvinyl chloride or emulsion grade in powder form, having a particle size of 1–2 microns and a molecular weight of 70,000–80,000, sold by Monsanto Chemical Co., 100 parts;

Harflex 330, a polymeric plasticizer, manufactured by Wallace & Tiernan, Inc., 40 parts;

Diisooctyl phthalate, a non-toxic plasticizer, 40 parts;

Hydrated aluminum oxide (H–1, Aluminum Corp. of Canada), having a particle size such that 75–83% of the material passes through a 325 mesh screen, 20 parts;

Stayrite 90, a mixture of non-toxic metallic stearates sold by the Witco Chemical Co., 1 part; and Sodium perborate, 3 parts;

the parts being expressed by weight. (Disodium phosphate, at a level of 3 parts, may be substituted for the Stayrite 90 with comparable results.)

The fluid mix was prepared by adding the Harflex 330 and the diisooctyl phthalate to a mixing vessel together with the sodium perborate and Stayrite. These materials are stirred to make a uniform suspension. The Opalon 410 resin is then added and mixed to thoroughly wet the resin powder with the liquid mixture. The aluminum oxide is then added and uniformly blended until a smooth mixture is obtained. The fluid mix is then de-aerated to remove entrapped air.

A conventional tin-coated steel shell is lacquered with a conventional vinyl resin lacquer. A non-foamable polyvinyl chloride plastisol comprising a mixture of emulsion grade polyvinyl chloride in a liquid plasticizer is sprayed in a thin layer on the inside top panel of the crown. The layer of plastisol is prevented from contacting the skirt portion of the crown. The layer of non-foamable plastisol is then heated to a temperature of 350° F. for one minute to flux the resin components of the plasticol and to cause it to set. As little as 50 mg. of unfoamed plastisol are applied in this manner.

After the crown has been returned to room temperature, a ring of the foamable fluid mix prepared above is applied to the peripheral area of the top panel of the crown in engagement with the skirt portion and with the previously applied layer of plastisol. Approximately 110 mg. of the foamable mix is applied in this manner. The crown is then heated to a temperature of about 300° F. for a period of three minutes to cause the ring of foamable material to foam. The ring expands to approximately three to four times its original volume, adheres to the top panel and to the skirt portion of the crown and takes the form in cross-section of a quadrant having its arcuate surface extending between the top panel and the skirt portion. The width of the foamed ring, i.e., distance between the inside and outside diameter thereof, is approximately ⅛ inch. The crown is then cooled and is ready to apply as a closure to bottles containing carbonated beverages.

The sealing characteristics of the crown prepared according to this example are excellent and surpass, in some respects, the sealing characteristics of cork liners. In addition, no reaction takes place between the carbonated beverages and the liner or the cap itself. Furthermore, no off-flavors are imparted to the contents of the container because the plasticizer and other ingredients of the foamable material are essentially non-reactive with the container's content.

*Additional foamable fluid mixes*

Table 1 below gives the formulations of eight additional foamable fluid mixes which may be employed according to this invention. The compositions illustrate a number of oxygen adsorbing materials which may be employed, either alone or in combination with another oxygen adsorbing material. These mixes were prepared following the method set forth above, care being taken that the vinyl resin was thoroughly mixed with and wetted by the plasticizer before the oxygen adsorbing material was added to the mix.

TABLE 1.—FOAMABLE FLUID MIX (PARTS BY WEIGHT)

| Ingredient | A | B | C | D | E | F | G | H | I |
|---|---|---|---|---|---|---|---|---|---|
| Geon 121 | | | | | 100 | 50 | | | 38 |
| Opalon 410 | 100 | 100 | 100 | 100 | | | 50 | 50 | 62 |
| Dioctyl phthalate | 90 | 90 | 90 | 90 | 90 | 45 | 45 | 45 | |
| Plastolein 9720 | 12 | | 12 | 12 | | 6 | 6 | 6 | |
| Harflex 500 | 30 | 30 | 30 | 30 | 30 | 15 | 15 | 15 | |
| Disodium phosphate | 6 | 12 | 6 | 6 | 3 | 3 | 3 | 3 | |
| Sodium perborate | 25 | 25 | 15 | 45 | 25 | 12.5 | 12.5 | 12.5 | 3 |
| Mica, No. 75 | 5 | | 2 | 2 | | | 2.5 | 5 | |
| Syloid 244 | 1.5 | | 1 | 1.5 | 10 | | | 1.25 | |
| Activated carbon | 0.5 | | | | | | | | |
| Santicizer 141 | | 12 | | | 12 | | | | |
| Anhydrous borax, powdered | | 25 | | | | | | | |
| Aluminum flake, metal powder | | | | 1 | | | | | |
| Raven Black (carbon) | | | | 0.5 | | | | | |
| Sparmite (Barium sulfate) | | | | | | 1.25 | | | |
| Acetyl-tributyl citrate | | | | | | | | | 100 |
| Stayrite 90 | | | | | | | | | 1 |
| Aluminum oxide, anhydrous | | | | | | | | | 20 |
| Coloring agent | | | | | | | | | .5 |
| TiO₂ | | | | | | | | | 10 |

Referring to the ingredients in Table 1 above, Geon 121 is a white powdery stir-in vinyl chloride resin having a molecular weight of about 70,000 to 80,000, a particle size such that 100 percent thereof will pass through a screen of 100 mesh on the Tyler scale when determined by wet screen analysis, a specific gravity of about 1.40, a bulk density of 20–25 pounds per cubic foot and a specific viscosity of about 0.57–0.63; and Opalon 410 is a white powdery stir-in vinyl chloride resin having a molecular weight of about 70,000 to 80,000, a particle size of 1–2 microns, a specific gravity of about 1.40, a specific viscosity of about .53–.55 determined as a solution of .40 gram of resin in 100 ml. of cyclohexane at 25° C., a dry bulk density of about .25–.35 gram per cubic centimeter. Similarly Plastolein 9720 and Harflex 500 are plasticizers and are described earlier in the specification. The Mica No. 75 is a finely divided mica sold by the U.S. Mica Company. Syloid 244 is a highly porous pure silica gel in the form of a free flowing, white powder, having a density of 4.0–4.5 lbs./cu. ft. and a particle size of 2–3 microns, manufactured by Davison Chemical Company. The Santicizer 141, an alkyl aryl phosphate, is sold by Monsanto Chemical Company. The aluminum flake is a finely divided metallic aluminum sold by the Aluminum Corporation of America, bearing the numerical designation 221. The Raven Black is a finely divided carbon sold by the Columbian Carbon Company, a division of Southern Chemical Company. The Sparmite is a finely divided barium sulfate sold by C. K. Williams Company.

Fluid mixes described in Table 1 are useful in a variety of applications. Composition E requires 40 minutes of heating to fuse, whereas most of the other compositions will fuse within 20 minutes. Composition E will provide six-fold increase in volume. Composition H is particularly acceptable in that it provides a reasonably soft foam having good deflection characteristics. This composition provides a sixteen-fold increase in volume during unconfined blowing. Composition I is particularly useful and preferred as the heat foamable mix for depositing the annular foamed sealing ring in the liner of the crown type closures intended for carbonated soft drinks.

*Screw-top closures for containers*

Screw-top closures for glass or metal containers may be provided with liners made of foamed resin in accordance with this invention, in the place of the wax-coated or resin-coated paper lined or rubber gasketed closures or plastisol liners heretofore used. The foamed liner material in accordance with this invention enables one to obtain a better seal at considerably lower cost. A suitable composition is a fluid mix such as that used for manufacturing either the standard size or the shallow crown above described.

A suitable amount of the fluid mix is deposited on the screw-top shell. The heating to effectuate the blowing thereof, and the subsequent "ovening" to effectuate fusion of the foamed material, are carried out as described above.

It will be understood, of course, that the metal shell should be provided with a suitable lacquer coating to provide for adherence of the foamed liner.

It will be noted that the foamed products and articles provided therewith which are made in accordance with this invention result from the heating of a ring of fluid mix comprising polyvinyl chloride, plasticizing material (a single plasticizer or a plurality of plasticizers), and an oxygen compound which is capable of releasing elemental or nascent oxygen when the mix is heated to about 200° F. to initiate gassing or blowing.

As has been shown, a suitable acidic component of the mixture, such as a metal hydrogen phosphate, e.g., an alkali or alkaline earth metal phosphate, as aforesaid, functions both as a stabilizer and as a reactant with the oxygen donor or releasor, for example, a perborate, a peroxide or a chlorate, etc.

Fluid mixes embodying the specifically named components shown above have a general composition as follows:

Based on 100 parts of polyvinyl chloride, the plasticizing material is present in an amount of from about 50 to 200 parts, preferably from 25 to 60 parts; the dual functioning stabilizer and acidic component, i.e., disodium phosphate is present in an amount from 3 to 25 parts, preferably from 6 to 12 parts; and the oxygen releasing compound, the sodium perborate as the blowing agent, is present in an amount from 2 to 45 parts, preferably 3 to 30 parts, based on the total amount of polyvinyl chloride and plasticizing material. In specific applications the determination of the amount of blowing agent employed is adjusted according to need, i.e., the crown takes 6 parts of blowing agent, a cushion takes 25 parts of said blowing agent and other products, sufficient blowing agent to provide suitable expansion.

As to the amount of the filler-adsorber component of the mix, it varies according to the desired use of the end products with respect to resilience of the foamed material and the adsorptive quality of the filler in providing the specific desired volume of the blown or expanded material. While the amount of the filler or oxygen adsorbing agent to be used for specific applications may readily be determined by a laboratory test, it may be present, relative to the blowing agent, in a ratio of from 1:1 to 60:1, by weight.

The theoretical considerations underlying the amounts of filler-adsorber to be used appear to be as follows: The amount of filler-adsorber and blowing agent may be varied as stated above, but the amount of filler-adsorber present with any given amount of any given blowing agent must be sufficiently small that subsequent liberation of oxygen provides a cellular structure and sufficiently large to prevent at least substantially uncontrolled oxygen release. Merely adding a substantial quantity of filler having oxygen adsorbing properties, without adjusting the amount thereof as herein specified, causes adsorption by too many different filler particles and results in insufficient ultimate blowing. In accordance with these theoretical considerations, an oxygen adsorbing agent is a composition present in sufficient amount to control, but not suppress, blowing.

What is claimed is:

1. Method of forming a closure for a container which method comprises the steps of (1) providing a cup shaped shell having a substantially flat top panel and depending skirt, (2) applying a protecting coating to at least the interior surfaces of said top panel, (3) engaging the inner surface of said shell with a discharge means having an annular shaped outlet and die member so disposed that an extrudate extruded from said orifice is confined to the area of the inner surface of said shell adapted to an engagement lip of the container; (4) extruding from said annular shaped outlet an annular shaped extrudate of heat foamable plastisol which comprises a finely divided particulate vinyl resin, a plasticizing amount of plasticizer therefor, an effective amount of a heat decomposable component which releases nascent oxygen at temperatures above about 200° F. sufficient to foam said plastisol and to expand same to at least three times its original volume, an effective amount of an acidic component having an acidity as to said heat decomposable component sufficient to facilitate the decomposition thereof so as to release nascent oxygen in situ, and an effective amount of a finely divided solid which first adsorbs oxygen and controllably releases the adsorbed oxygen at the foaming temperature of the plastisol at a rate which produces a stable cellular foam, (5) disengaging said discharge means thereby depositing said annular shaped extrudate in the shell; and (6) then subjecting the shell with deposited annular shaped extrudate for a period of time to a temperature sufficient to flux the components of the plastisol and to initiate foaming of the foamable plastisol so as to expand same to a volume of at least about three times the deposited volume to form a cured cellular annular sealing portion taking the form in cross section substantially that of a quadrant having its arcuate surface extending between the top panel and the depending skirt and having a minimum contact with the content of the container.

2. A method according to claim 1 wherein the vinyl resin is an emulsion grade polyvinylchloride, the heat decomposable component which releases nascent oxygen is an alkali metal borate, the acidic component is selected from the group consisting of an alkali metal hydrogen phosphate, and a non-toxic metallic soap and mixtures thereof and the finely divided solid particulate component which first adsorbs oxygen and controllably releases the adsorbed oxygen is selected from the group consisting of anhydrous aluminum oxide, resin coated chalk, activated carbon, mica, silica gel, barium sulfate, carbon black, aluminum flakes, resin-coated calcium carbonate, anhydrous borax, magnesium trisilicate and mixtures thereof.

3. The method according to claim 1 wherein the cavity formed by said top panel, said annular extrudate and said discharge means is subjected to pressure sufficient to prevent formation of a vacuum in said cavity.

4. The method according to claim 1 wherein the shell with the deposited annular shaped extrudate of foamable plastisol is subjected to rotational motion and the rotating surface of the plastisol extrudate contacted with a skimming means having a concave arcuate contact surface extending between the top panel and depending skirt of the shell for a period of time sufficient to dispose the annular shaped deposit into uniformly taking the form in cross section substantially that of a quadrant having its arcuate surface extending between the top panel and depending skirt prior to being subjected to elevated temperatures.

5. A method of forming a closure for a container which method comprises the steps of (1) providing a crown closure having a substantially flat top panel, a curved corner radius and depending skirt, (2) applying a thin layer of non-foamable plastisol to the inner surface of the crown closure, (3) depositing an annular shaped extrudate of heat foamable plastisol which comprises a finely divided particulate vinyl resin, a plasticizing amount of plasticizer therefor, an effective amount of a heat decomposable component which releases nascent oxygen at temperatures above about 200° F. sufficient to foam said plastisol and to expand same to at least 3 times its original volume, an effective amount of an acidic component having an acidity as to said heat decomposable component sufficient to facilitate the decomposition thereof to release nascent oxygen in situ, and an effective amount of a finely divided solid particulate component which first adsorbs oxygen and controllably releases the adsorbed oxygen at the foaming temperature of the plastisol at a rate which produces a stable cellular foam confining said annular shaped extrudate to the peripheral portion of the inner surface adapted to engage the lip of the container, (4) subjecting the crown closure with the deposited annular shaped extrudate of foamable plastisol to rotational motion and contacting the rotating surface of the foamable plastisol with a skimming means having a concave arcuate contact surface extending between said top panel and said depending skirt for a period of time sufficient to dispose the annular shaped deposit into uniformly taking the form in cross section substantially that of a quadrant having its arcuate surface extending between the top panel and depending skirt, and (5) then subjecting the crown closure and plastisols for a period of time to a temperature sufficient to flux the components of the plastisols and to initiate foaming of the foamable plastisol so as to expand same to a volume of at least about 3 times the deposited volume.

6. The method of claim 5 wherein the non-foamable plastisol is limited to the central portion of the inner surface of the top panel to be directly exposed to the container's content so as to form a plastisol pad spaced apart from the curved corner radius and the annular shaped heat foamable plastisol extrudate is confined so as to overlie the curved corner radius from the depending skirt to said pad, the exposed surface of said pad and annular extrudate being substantially continuous.

7. The method of claim 6 wherein the crown closure with the layer of non-foamable plastisol is first subjected to temperatures sufficient to flux the components of the plastisol and the annular shaped heat foamable plastisol extrudate is then deposited at ambient temperatures.

8. The method of claim 6 wherein the non-foamable plastisol pad and heat foamable annular shaped extrudate are subjected concurrently to a temperature above about 300° F. to foam and cure the foamable plastisol and cure the non-foamable plastisol.

9. The method according to claim 6 wherein the vinyl resin is an emulsion grade polyvinylchloride, the heat decomposable component which releaeses nascent oxygen is an alkali metal borate, the acidic component is selected from the group consisting of an alkali metal hydrogen phosphate, and a non-toxic metallic soap and mixtures thereof and the finely divided solid particulate component which first adsorbs oxygen and controllably releases the adsorbed oxygen is selected from the group consisting of anhydrous aluminum oxide, resin-coated chalk, activated carbon, mica, silica gel, barium sulfate, carbon black, aluminum flakes, resin-coated calcium carbonate, anhydrous borax, magnesium trisilicate and mixtures thereof.

10. The method according to claim 9 wherein the alkali metal is sodium and the polyvinylchloride has a particle size ranging from 1 to 2 microns and a molecular weight of 70,000 to 80,000.

11. A method of forming a crown closure comprising providing a steel crown blank having a substantially flat top panel and a skirt portion, applying a protective coating to the interior surface of the top panel, the protective coating comprising a layer of a vinyl lacquer overlying the surface of the blank and a layer of vinyl plastisol overlying the lacquer, depositing a substantially ring-shaped charge of foamable gasket-forming material to the coated panel adjacent the periphery thereof, the charge being confined to that portion of the inner surface of the top panel which will have minimum contact with container contents, and heating the closure to cause foaming of the charge.

12. A method of forming a closure comprising providing a blank having a substantially flat top panel and a skirt portion, applying a protective coating to the interior surface of the top panel, depositing a substantially ring-shaped charge of foamable gasket-forming material to the coated panel, the charge being substantially confined to that portion of the interior surface of the closure which will have contact with a sealing portion of a container in use, and heating the charge to cause foaming of the same.

13. The method of claim 12 wherein said foamable gasket-forming material is a fluid mix comprising a resin, a plasticizer, and a blowing agent, and wherein said charge is deposited at ambient temperature.

14. The method of claim 13 wherein said fluid mix comprises a finely divided particulate vinyl resin, a plasticizing amount of plasticizer therefor, an effective amount of a heat decomposable component which releases nascent oxygen at temperatures above about 200° F., an effective amount of an acidic component having an acidity as to said heat decomposable component sufficient to facilitate the decomposition thereof so as to release nascent oxygen in situ and an effective amount of a finely divided solid which first adsorbs oxygen and controllably releases the adsorbed oxygen at the foaming temperature of the fluid mix at a rate which produces a stable cellular foam.

15. The method of claim 13 wherein the ring is foamed to at least 3 times its original volume.

16. The process of claim 13 wherein the ring is foamed at atmospheric pressure.

17. The process of claim 13, wherein the blowing agent in the fluid mix is one which is capable of releasing oxygen gas at elevated temperatures, and wherein the fluid mix also comprises an oxygen adsorbing agent.

18. A method of providing a sealing cushion structure on a crown closure having a top panel, a curved corner radius and a skirt portion comprising the steps of applying a non-foaming plastisol on the inside surface of the top panel to form a central cushion pad spaced apart from the curved corner radius, depositing a ring of a foamable fluid mix comprising a resin, a liquid plasticizer therefor and a blowing agent to the periphery of the inside surface overlying the curved corner radius between the skirt portion extremity and the plastisol pad, then subjecting both the pad and the ring concurrently to a temperature above about 300° F. to foam and cure the ring and to cure the pad.

19. A method of providing a sealing cushion structure on a crown closure having a top panel and a skirt portion depending from the periphery of said top panel, which method comprises the steps of: (1) spraying a plastisol comprising an emulsion grade polyvinyl chloride resin and a plasticizer therefor onto the inside surface of the top panel to form a central cushion pad spaced apart from said periphery; (2) heating the plastisol to 350° for a time sufficient to flux the resin components and cooling the plastisol to room temperature; (3) depositing about said periphery and at ambient temperature, a ring of a foamable fluid mix comprising an emulsion grade polyvinyl chloride having a molecular weight of 70,000–80,000, a polymeric type plasticizer for polyvinyl chloride, diisooctyl phthalate, finely divided hydrated aluminum oxide and sodium perborate; (4) subjecting said ring of fluid mix to a temperature of about 300° F. for a time sufficient to expand the ring to at least approximately 3 times its original volume, and cooling the ring and closure.

20. A method of forming a closure comprising providing a blank having a substantially flat top panel and a skirt portion, applying a protective coating to the interior surface of the top panel, depositing a substantially ring-shaped charge of foamable gasket-forming material to the coated panel adjacent the periphery thereof, subjecting said blank to rotational motion and contacting the rotating surface of the said charge with a concave arcuate skimming surface extending between said top panel and said depending skirt portion for a period of time sufficient to dispose said charge into uniformly taking the form of a quadrant having its arcuate surface extending between said top panel and said depending skirt portion, and heating said charge to cause foaming of the same.

References Cited by the Examiner

UNITED STATES PATENTS

| | | | |
|---|---|---|---|
| 2,114,308 | 4/1938 | McGowan et al. | 264—268 XR |
| 2,528,506 | 11/1950 | Foye | 264—268 |
| 2,548,305 | 4/1951 | Gora | 264—268 XR |
| 2,553,590 | 5/1951 | Joswig | 264—268 |
| 2,777,164 | 1/1957 | Strahm | 18—30 |
| 2,834,498 | 5/1958 | Olt et al. | 215—40 |
| 2,841,304 | 7/1958 | Zipper | 215—40 |
| 2,904,522 | 9/1959 | Catlin et al. | 260—2.5 |
| 2,961,704 | 11/1960 | White | 18—30 |
| 2,966,470 | 12/1960 | Maltenfort | 260—2.5 |
| 3,032,826 | 5/1962 | Brillinger | 264—45 |
| 3,037,474 | 6/1962 | Navikas. | |
| 3,100,678 | 8/1963 | Joiner et al. | 264—45 |

ROBERT F. WHITE, *Primary Examiner.*

FRANKLIN T. GARRETT, *Examiner.*

J. B. MARBERT, M. R. DOWLING, *Assistant Examiners.*